United States Patent

[11] 3,532,183

| [72] | Inventor | Noah A. Shealy |
| | | Niles, Michigan |
| [21] | Appl. No. | 708,346 |
| [22] | Filed | Feb. 26, 1968 |
| [45] | Patented | Oct. 6, 1970 |
| [73] | Assignee | Clark Equipment Company |
| | | a corporation of Michigan |

[54] LUBRICATION SYSTEM FOR A DIFFERENTIAL
6 Claims, 5 Drawing Figs.

[52] U.S. Cl. .......................................... 184/10, 74/11, 184/13
[51] Int. Cl. .......................................... F16n 7/16
[50] Field of Search ................................ 184/10, 6(U), 11, 13, 11(A); 74/467, 468, 711, 710.5

[56] References Cited
UNITED STATES PATENTS

| 2,821,096 | 1/1958 | Lyeth | 74/711 |
| 2,930,256 | 3/1960 | Wildhaber | 74/711 |
| 2,762,233 | 9/1956 | Orr | 184/6X |
| 2,842,226 | 7/1958 | Liebel | 184/6 |
| 2,861,477 | 11/1958 | Mueller | 184/6X |
| 3,138,222 | 6/1964 | Dames et al. | 184/11 |
| 3,162,269 | 12/1964 | Reed | 184/6 |
| 3,182,527 | 5/1965 | Bryan | 184/11X |

FOREIGN PATENTS

| 690,130 | 7/1964 | Canada | 74/711 |

*Primary Examiner*—Manuel A. Antonakas
*Attorneys*—Kenneth C. Witt, John C. Wiessler, Robert H. Johnson and Reginald J. Falkowski

ABSTRACT: A dual drive axle assembly having a differential for dividing power between the two axles and a non-pressurized system for supplying lubricant to the interior of the differential. A ring connected to a carrier receives and directs fluid radially inwardly of passage means so as to provide lubrication to the interior of the carrier.

Patented Oct. 6, 1970

INVENTOR
NOAH A. SHEALY
BY Robert H. Johnson
ATTORNEY

INVENTOR
NOAH A. SHEALY
ATTORNEY 3,532,183

LUBRICATION SYSTEM FOR A DIFFERENTIAL

SUMMARY OF THE INVENTION

In carrying out my invention in a preferred embodiment there is provided at least one fluid passage in a differential carrier that is located radially inwardly of the outer periphery of the carrier and a ring connected to the carrier adjacent the passage for receiving fluid and directing it into the interior of the carrier via the fluid passage.

DESCRIPTION OF THE PREFERRED EMBODIMENT

Figure 1:
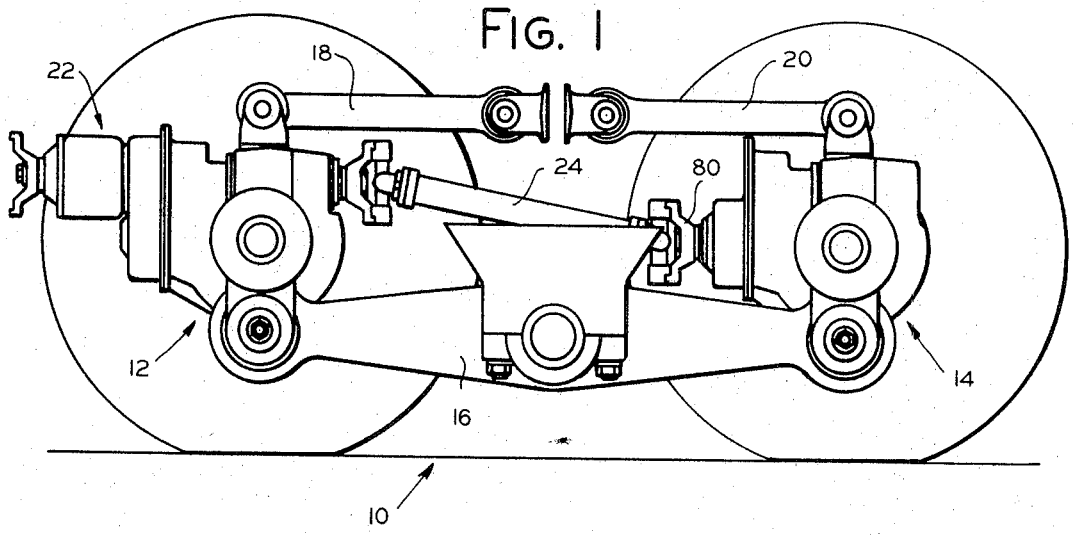
FIG. 1 is a side elevation of a dual drive axle assembly embodying my invention.

Referring now to FIG. 1, the reference numeral 10 denotes generally a dual drive axle assembly for use with truck tractors and the like. Assembly 10 includes a front axle 12 and a rear axle 14. Axles 12 and 14 are connected to the associated truck tractor by means of a suspension system which includes a rocker arm 16 and a pair of stabilizer arms 18 and 20. Power to drive assembly 10 is supplied from a prime mover, not shown, to an interaxle differential 22 which divides the power between front axle 12 and rear axle 14, axle 14 being connected to differential 22 by a shaft 24.

Referring now also to drawings 2 through 5, inclusive, inter-axle differential 22 includes a housing 26 connected to the housing 28 for front axle 12. Differential 22 is of a conventional bevel gear type and includes a carrier 30 which is mounted for rotation in housing 26 by means of bearing 32. Integral with carrier 30 is an input shaft 34 which is adapted to be connected to the prime mover so that carrier 30 can be driven. Carrier 30 preferably is made in two pieces which are held together by a plurality of nut and bolt assemblies 36, the two pieces having clamped between them a so-called cross 38 which includes a plurality of shafts 40 on each one of which a pinion gear 42 is mounted for rotation. Disposed on each side of gears 42 and mounted for rotation within carrier 30 are side gears 44 and 46 which mesh with gear 42, as shown.

At this point it will be seen that carrier 30 is hollow and in the interior thereof contains gears 42, 44 and 46. Further, carrier 30 is generally closed, except for a plurality of generally axially extending fluid passages 48 which are located radially inwardly of the outer periphery 50 of carrier 30 and which serve to supply lubricating fluid to the interior of carrier 30 and a plurality of fluid passages formed by a pair of chordal grooves cut in each shaft 40 and extending longitudinally thereof so that lubricating fluid which is supplied to the interior of carrier 30 through passages 48 can be exhausted through the passages formed by chordal grooves 52.

Power supplied to differential 22 is divided, according to the requirements of front axle 12 and rear axle 14, between side gears 44 and 46. Power is transmitted from side gear 46 to front axle 12 via a sleeve shaft 54 which is splined to side gear 46 at 56 and mounted for rotation in bearings 58, a transfer gear 64 splined to sleeve shaft 54 at 62, another transfer gear 64 which meshes with transfer gear 60 and which is drivingly connected to a shaft 66 that has integral therewith a double gear 68 that meshes with a ring gear 70 which is connected to a conventional differential 72 located in axle housing 28 and which serves to divide power between the axle shafts 74, only one of which is shown, of front axle 12.

Similarly, power from side gear 44 is transmitted to rear axle 14 via a shaft 76 which is splined to side gear 44 at 78, shaft 24 which is drivingly connected to shaft 76 and an input shaft 80 which is connected to a conventional differential, not shown, disposed in rear axle 14 and through which power is transmitted to the axle shafts.

Figure 2:
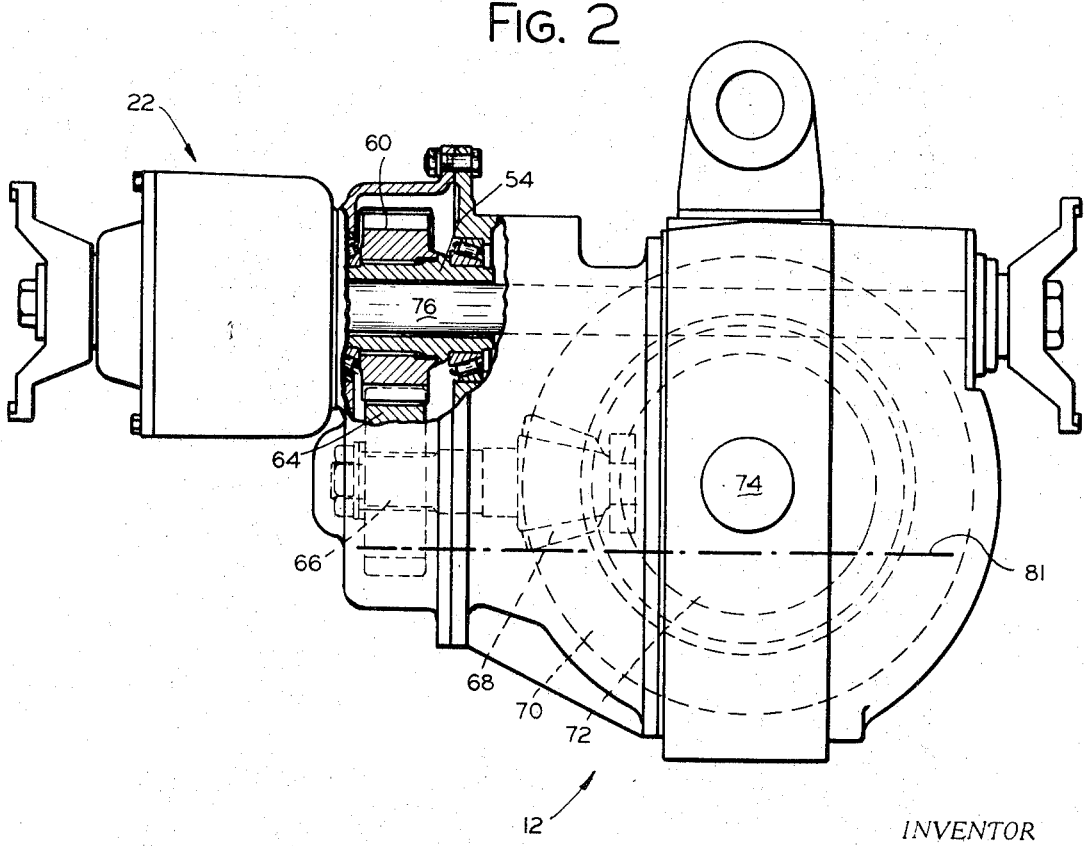
FIG. 2 is a side elevation on an enlarged scale of the front axle, showing to advantage a portion of the lubrication system.
Figure 3:
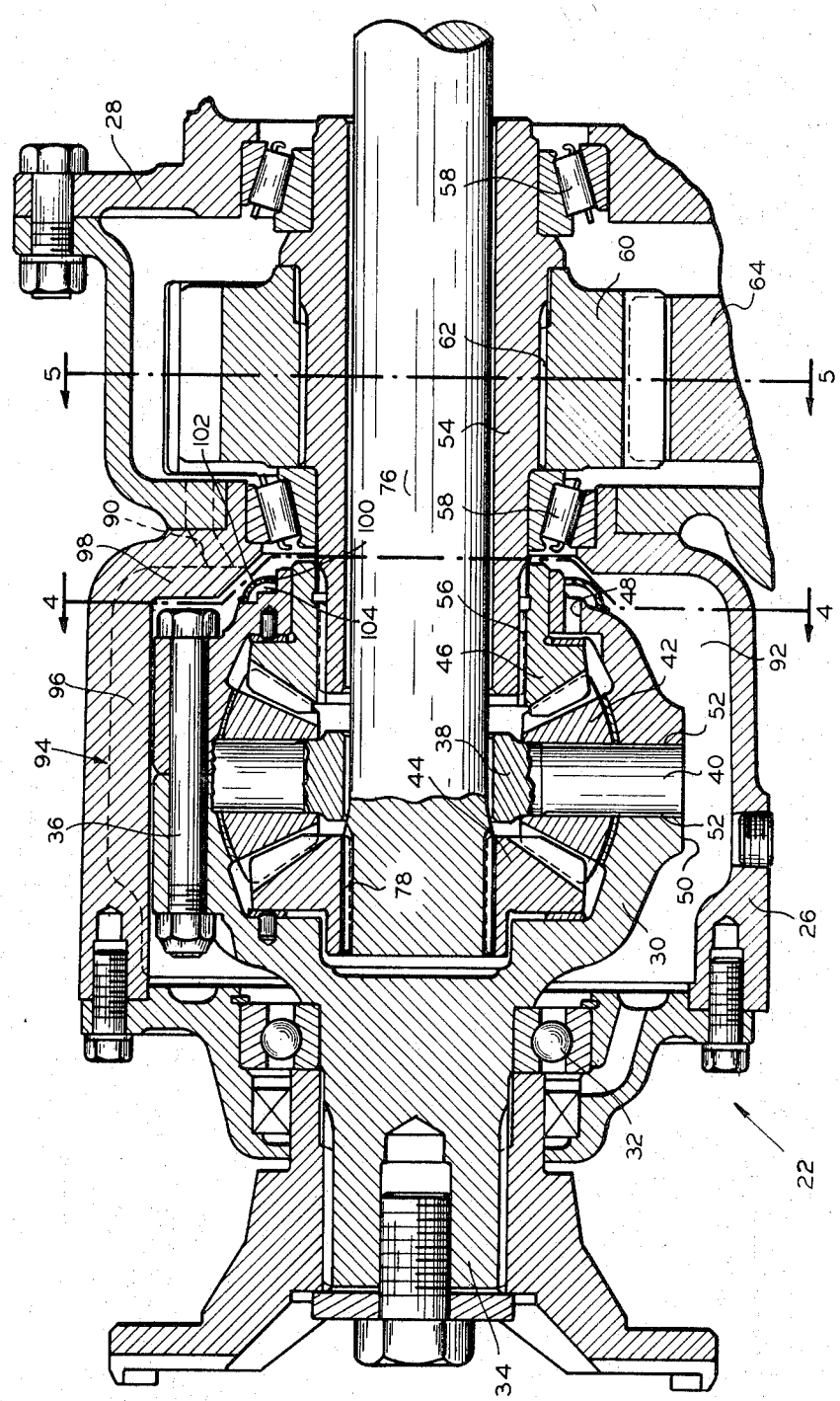
FIG. 3 is a longitudinal section on an enlarged scale of the inter-axle differential.
Figure 5:
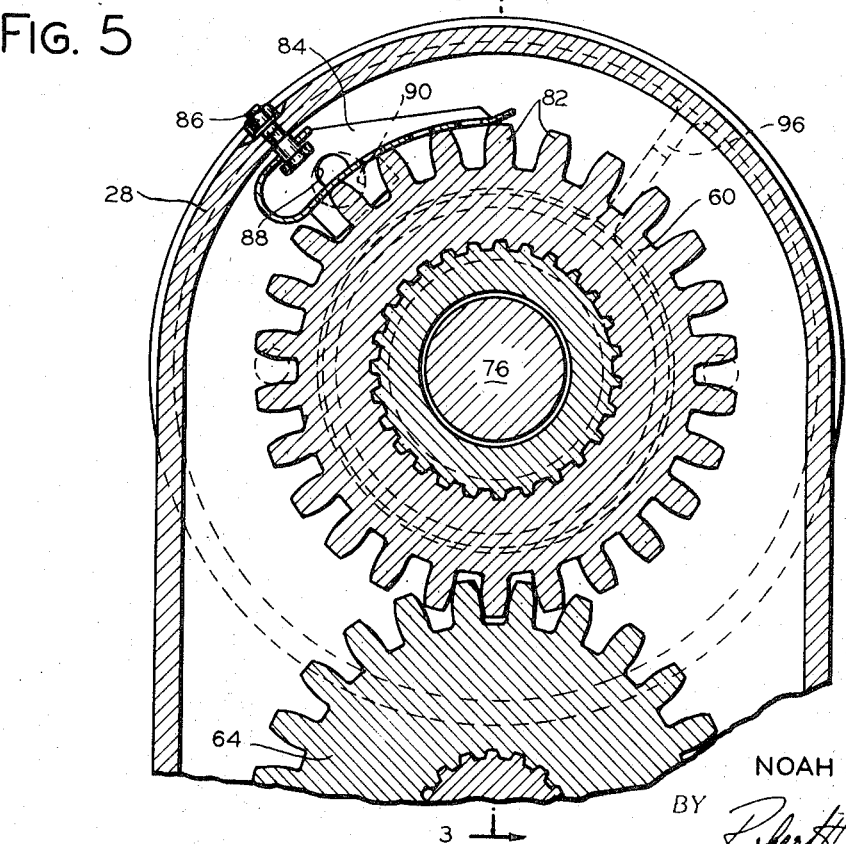
FIG. 5 is a cross section taken along line 5-5 of FIG. 3.

In order to lubricate inter-axle differential 22, oil, or some other suitable lubricating fluid, which is maintained at approximately the level 81 shown in FIG. 2 must be supplied to the interior of carrier 30 by a lubrication system. A portion of the lubricating fluid contained in axle housing 28 clings to gear 64 which extends somewhat below level 81. Consequently, during rotation of gear 62 and gear 60 some of the lubricating fluid is transferred to the tips of the teeth 82 of gear 60. When axles 12 and 14 are being driven in a forward direction gear 60 will rotate in a counterclockwise direction, as shown in FIG. 5, so that lubricating fluid clinging to the tips of gear teeth 82 is scraped therefrom by means of a scraper 84 which is mounted on axle housing 28 by means of a nut and bolt assembly 86. Lubricating fluid removed from gear teeth 82 by scraper 84 then flows by gravity through an opening 88 in one side thereof into and through a fluid passage 90 (shown rotated out of position in FIG. 3) into an annular chamber 92 formed between differential housing 26 and carrier 30.

Figure 4:
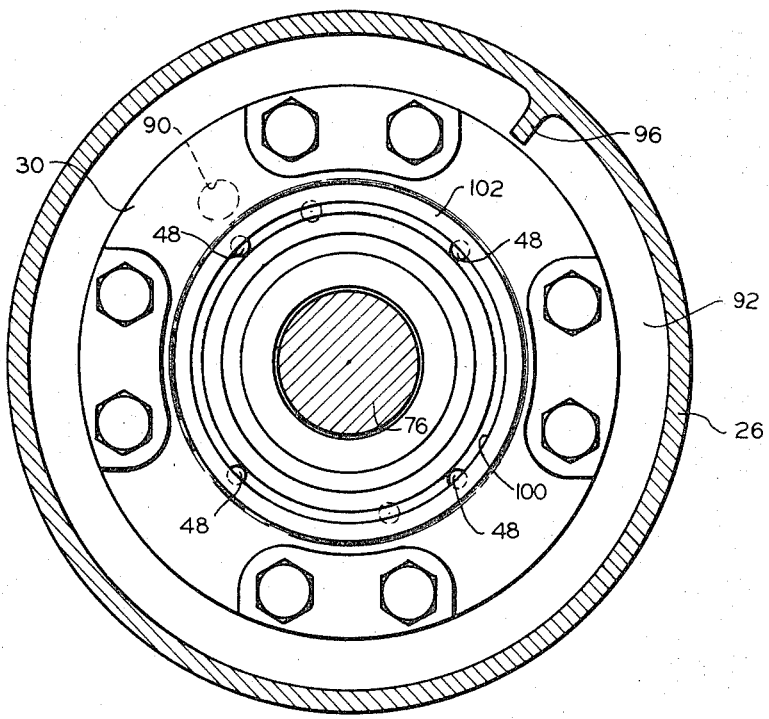
FIG. 4 is a cross section taken along line 4—4 of FIG. 3.

Lubricating fluid which is supplied to chamber 92 tends, during rotation of carrier 30, to be thrown out against the interior of differential housing 26 and also tends to rotate in the same direction as carrier 30 which, in the case of forward drive is counterclockwise, as viewed in FIG. 4. It will be noted that a rib 94 which preferably is cast integrally with differential housing 26 extends into annular chamber 92, as shown best in FIGS. 3 and 4. Rib 94 includes a portion 96 which terminates closely adjacent to the outer periphery 50 of carrier 30 and extends generally parallel with the axis of rotation of carrier 30 and a portion 98 which also terminates closely adjacent carrier 30 and extends generally radially inwardly. Consequently, rib 94 acts to restrict fluid flow in chamber 92 so that lubricating fluid builds up in front of rib 94 to a point where it spills over the edge of the lip 100 of a ring 102 into an area 104 between ring 102 and carrier 30. Ring 102 is fixed to carrier 30 by any suitable means, such as welding, adjacent fluid passages 48 and it should be noted that lip 100 is disposed radially inward of at least a portion of fluid passages 48. Thus, during rotation of carrier 30 lubricating fluid in area 104 tends to be forced against ring 102 due to centrifugal force from the rotation of carrier 30, and therefore will be forced through fluid passages 48 into the interior of carrier 30 adjacent the mesh of gears 42 and 46. The lubricating fluid which is supplied to the interior of carrier 30 eventually will work down to chordal grooves 52 and hence be thrown out of carrier 30 and back into annular chamber 92.

The lubricating fluid which is supplied to chamber 92 through passage 90 eventually flows out of chamber 92 through bearing 58 and hence back to the fluid reservoir in axle housing 28.

At this point it will be apparent that I have provided a novel lubrication system by which lubricating fluid is supplied to the interior of differential carrier 30 and then returned to the fluid reservoir in axle housing 28 all without using any lubricating pump and by making use of centrifugal force which ordinarily works to prevent lubricating fluid from entering carrier 30.

Although only a single embodiment of my invention has been described in detail, it will be understood that such description is illustrative only. Various changes and modifications can be made to my invention without departing from the scope and spirit of it, and so the limits of my invention should be determined from the claims.

I claim:

1. A differential having a generally closed hollow carrier mounted for rotation about an axis of rotation, the said carrier having an outer periphery located radially outwardly of the axis of rotation, and a lubrication system comprising fluid passage means extending between the exterior and interior of the said carrier and generally parallel to the axis of rotation so that centrifugal force will cause fluid to flow through the said fluid passage means from the exterior of the said carrier to the interior of the said carrier, the said passage means being disposed radially inwardly of the outer periphery of the said carrier, means connected to the said carrier for conjoint rotation therewith for receiving fluid and directing it into the said passage means, and means for supplying fluid to the said fluid receiving and directing means.

2. A differential as set forth in claim 1 wherein the said fluid receiving and directing means is a ring, the said ring having a portion disposed radially inwardly of at least a portion of the said passage means.

3. A differential having a housing and a generally closed hollow carrier mounted for rotation in the housing about an axis of rotation and defining with the housing an annular chamber adapted to contain fluid, the said carrier having an outer periphery located radially outwardly of the axis of rotation, and a lubrication system comprising fluid passage means extending between the exterior and interior of the said carrier and generally parallel to the axis of rotation so that centrifugal force will cause fluid to flow through the said fluid passage means from the exterior of the said carrier to the interior of the said carrier, the said passage means being disposed radially inwardly of the outer periphery of the said carrier, means for restricting fluid flow around the chamber due to rotation of the said carrier so that during rotation of the said carrier fluid builds up in the chamber in front of the flow restricting means, and means connected to the said carrier for conjoint rotation therewith for receiving at least a portion of the fluid build up in front of the said flow restricting means and directing it into the said passage means.

4. A differential as set forth in claim 3 wherein the said restricting means is a rib connected to the housing.

5. A differential as set forth in claim 4 wherein the said rib includes a first portion closely adjacent the outer periphery of the said carrier and which extends generally parallel to the axis of rotation and a second portion which extends generally radially inwardly.

6. A differential as set forth in claim 3 wherein the said fluid receiving means is a ring, the said ring having a lip disposed radially inwardly of at least a portion of the said passage means.